United States Patent
Shin et al.

(10) Patent No.: US 8,347,198 B2
(45) Date of Patent: Jan. 1, 2013

(54) SEMICONDUCTOR MEMORY DEVICE HAVING CAPABILITY OF STABLE INITIAL OPERATION

(75) Inventors: Beom-Ju Shin, Kyoungki-do (KR); Sang-Sic Yoon, Kyoungki-do (KR)

(73) Assignee: Hynix Semiconductor Inc. (KR)

( * ) Notice: Subject to any disclaimer, the term of this patent is extended or adjusted under 35 U.S.C. 154(b) by 1220 days.

(21) Appl. No.: 12/217,064

(22) Filed: Jun. 30, 2008

(65) Prior Publication Data

US 2009/0222707 A1    Sep. 3, 2009

(30) Foreign Application Priority Data

Feb. 29, 2008  (KR) .................... 10-2008-0019066

(51) Int. Cl.
*G06F 11/08* (2006.01)
*G06F 11/30* (2006.01)
(52) U.S. Cl. ........................ 714/799; 714/758
(58) Field of Classification Search .................. None
See application file for complete search history.

(56) References Cited

U.S. PATENT DOCUMENTS

| | | | | |
|---|---|---|---|---|
| 4,353,128 A | * | 10/1982 | Cummiskey | 370/301 |
| 5,724,039 A | * | 3/1998 | Hayashi | 341/144 |
| 6,247,572 B1 | * | 6/2001 | Neborsky et al. | 194/200 |
| 6,321,366 B1 | * | 11/2001 | Tseng et al. | 326/94 |
| 6,340,899 B1 | * | 1/2002 | Green | 326/115 |
| 7,375,571 B1 | * | 5/2008 | Tiffany | 327/298 |
| 2005/0141331 A1 | * | 6/2005 | Cho | 365/233 |
| 2009/0006881 A1 | * | 1/2009 | Ogura | 713/500 |
| 2009/0132888 A1 | * | 5/2009 | Bains et al. | 714/758 |

FOREIGN PATENT DOCUMENTS

| | | | |
|---|---|---|---|
| JP | 62146036 A | * | 6/1987 |
| JP | 63109543 A | * | 5/1988 |
| JP | 05-259848 A | | 10/1993 |
| KR | 10-2005-0096177 A | | 10/2005 |

OTHER PUBLICATIONS

Carlsson, "Contributions to Asynchronous Communication Ports for GALS Systems", Dissertation No. 1062,p. 86, Linkoping University Institute of Technology, Sweden, 2006.*

* cited by examiner

*Primary Examiner* — Ajay Bhatia
*Assistant Examiner* — Dipakkumar Gandhi
(74) *Attorney, Agent, or Firm* — Blakely, Sokoloff, Taylor & Zafman

(57) ABSTRACT

A semiconductor memory device is capable of outputting a preset logic level through an EDC pin according to an operation mode during an initial operation, and providing a stable operation according to the specification of the semiconductor memory device just after the input of a data clock (WCK). The semiconductor memory device includes an output circuit configured to output a synchronous data in response to a data clock when the data clock is enabled, and output an asynchronous data when the data clock is disabled, and a data clock detection circuit configured to control outputting the asynchronous data by checking whether the data clock is in a stable state or not.

20 Claims, 7 Drawing Sheets

SEMICONDUCTOR MEMORY DEVICE HAVING CAPABILITY OF STABLE INITIAL OPERATION

CROSS-REFERENCE(S) TO RELATED APPLICATIONS

The present invention claims priority of Korean patent application number 10-2008-0019066, filed on Feb. 29, 2008, which is incorporated by reference in its entirety.

BACKGROUND OF THE INVENTION

The present invention relates to a high-speed semiconductor memory device, and more particularly to an apparatus and method for stably initializing an error detection code (EDC) pin during an initial operation of the high-speed semiconductor memory device.

In a system with a variety of semiconductor devices, a semiconductor memory device serves as a data storage. The semiconductor memory device outputs data corresponding to addresses received from a data processor, e.g., a central processing unit (CPU), or stores data received from the data processor into memory cells selected by the addresses.

As the operating speed of the system increases and semiconductor integrated circuit technologies are advanced, semiconductor memory devices are required to input and output data at higher speed. In order for faster and more stable operation of semiconductor memory devices, a variety of circuits inside the semiconductor memory devices must be able to operate at a high speed and transfer signals or data between the circuits at a high speed.

A fast operation of the semiconductor memory device can be achieved by executing a plurality of internal operations at higher speed and increasing signal and data input/output speeds. As one example, a double data rate (DDR) synchronous dynamic random access memory (DRAM) can achieve a high-speed data transfer by transferring data in synchronization with falling and rising edges of a system clock. Since the DDR SDRAM can input or output two data through one input/output terminal in one cycle of the system clock, its data input/output speed is higher than that of a typical semiconductor memory device. At present, a new semiconductor memory device has been proposed which can input and output four data in one cycle of a system clock.

The DDR SDRAM adopts a prefetch operation in order to output data at a high speed. The prefetch operation refers to an operation to previously store data or commands in a high-speed storage before the data or commands are processed. For example, the DDR SDRAM accesses memory cells and outputs 2-bit data through a data pad in each clock cycle. Such a prefetch operation is referred to as a 2-bit prefetch operation. In addition, a DDR2 SDRAM adopts a 4-bit prefetch operation to access memory cells and output 4-bit data to a data pad in each clock cycle. A DDR3 SDRAM adopts an 8-bit prefetch operation to access memory cells and output 8-bit data to a data pad in each clock cycle.

In this way, the data input/output speed must have been increased in order to enable the semiconductor memory device to operate at a high speed in synchronization with a high-frequency clock. Hence, the semiconductor memory device adopts an operation scheme that reads or writes data corresponding to a minimum burst length to each data input/output pad (DQ) in response to one-time read or write command. This scheme is referred to as an N-bit prefetch operation, where N is equal to the minimum burst length.

As described above, since a semiconductor memory device recently proposed is required to input or output four data in one cycle of a system clock, it adopts an 8-bit prefetch operation for high-speed data input/output. Eight data output from unit cells in response to one read command are transferred in parallel through the corresponding sense amplifiers and data input/output lines. The parallel data are serialized in order to output them through one data pad. In order to control such an operation, the semiconductor memory device includes a plurality of data output circuits respectively connected to a plurality of data input/output pads.

If not a physical damage inside a system, a data transfer error is generated by the mismatching of operation timing between a data transmitting side and a data receiving side. In general, since an operation margin is sufficient when a semiconductor memory device and a data processor transfer data in synchronization with a low-frequency system clock, data reliability is not greatly doubtful. However, if a semiconductor memory device and a data processor operate in synchronization with a clock system having a high frequency of, for example, 4 Gbps, data reliability may be greatly degraded because the operation margin for data transfer is not sufficient. Also, while the operating speed of the semiconductor memory device is increasing and four data are input/output in one cycle of the system clock, a separate apparatus and method are additionally required for ensuring the reliability as to whether the data transfer is exactly achieved. As one approach, a semiconductor memory device recently proposed includes a pin through which an error detection code (EDC) is output. The output of the EDC aims at detecting the error of data transferred in the read or write operation.

In order to ensure the reliability of data transfer, the semiconductor memory device outputs a cyclic redundancy check (CRC) data through an EDC pin. When the semiconductor memory device outputs the CRC data, the data processor receives the CRC data and detects the data error.

SUMMARY OF THE INVENTION

Embodiments of the present invention are directed to providing a semiconductor memory device that is capable of outputting a preset logic level through an EDC pin according to an operation mode during an initial operation, and providing a stable operation according to the specification of the semiconductor memory device just after the input of a data clock (WCK).

In accordance with an aspect of the present invention, there is provided a semiconductor memory device, which includes an output circuit configured to output a synchronous data in response to a data clock when the data clock is enabled, and output an asynchronous data when the data clock is disabled, and a data clock detection circuit configured to control outputting the asynchronous data by checking whether the data clock is in a stable state.

In accordance with another aspect of the present invention, there is provided a semiconductor memory device, which includes a clock detection circuit configured to notify that a data clock is stabilized when a predetermined time elapses after the input of an external data clock and an output circuit configured to output a logic high level signal until the data clock is stabilized after power is supplied, and perform one of an error detection mode and a strobe mode when the data clock is stabilized, in response to an output of the clock detection circuit.

In accordance with a further aspect of the present invention, there is provided a method for operating a semiconductor memory device, which includes controlling outputting an asynchronous data by checking whether a data clock is in a stable state, outputting the asynchronous data when the data clock is disabled and outputting a synchronous data in response to the data clock when the data clock is enabled.

The semiconductor memory device in accordance with the present invention can output the logic high level signal through the EDC pin in the initial operation until the data clock is stabilized, based on the specification. The semiconductor memory device must operate based on the specification of the Joint Electron Device Engineering council (JEDEC), the international standardization organization, so that it can be used together with control circuits (e.g., data processor) in the system and exchange data with other electronic circuits. The newly proposed semiconductor memory device includes a separate pin through which an EDC signal for ensuring the reliability of the high-speed data input/output operation is output. The semiconductor memory device outputs the CRC data through the EDC pin in order to perform the error detection operation in the read and write operations. The existing output circuit connected to the EDC pin cannot ensure the output of the logic high level signal until the data clock is stabilized during the initial operation (that is, after the power is initially supplied). However, before and after the data clock is stabilized, the semiconductor memory device in accordance with the present invention can operate based on the JEDEC specification through the detection circuit that detects the stabilization of the data clock.

DESCRIPTION OF SPECIFIC EMBODIMENTS

Hereinafter, a semiconductor memory device in accordance with the present invention will be described in detail with reference to the accompanying drawings.

Figure 1:
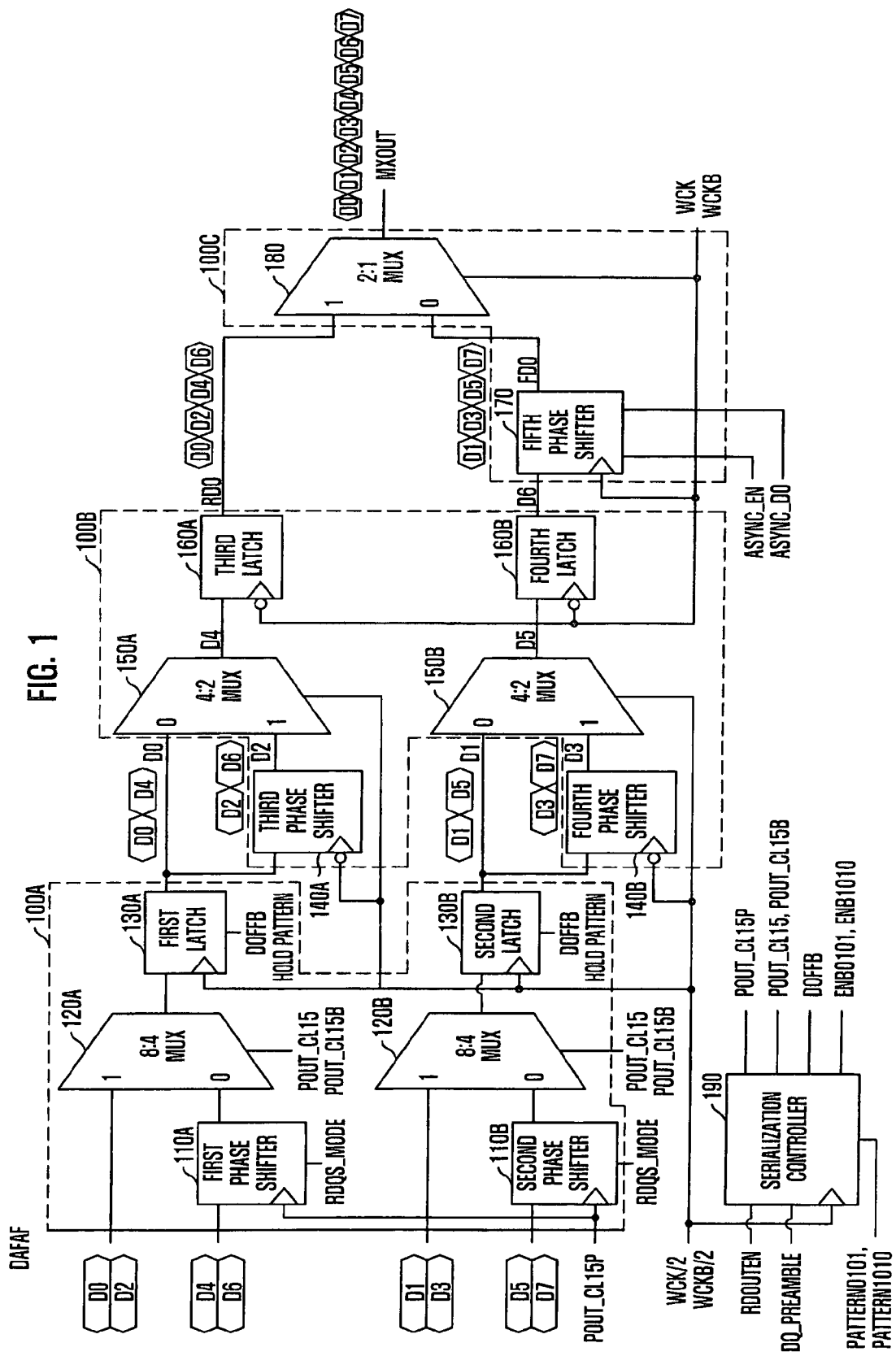
FIG. 1 is a block diagram of a conventional semiconductor memory device.

FIG. 1 is a block diagram of a conventional semiconductor memory device.

Referring to FIG. 1, the semiconductor memory device includes a pin through which a CRC data for error detection is output. A CRC data or a data strobe signal DQS is output through the pin according to an operation mode. At this point, the data strobe signal DQS is a signal that is output together with data output in response to a read command. Generally, the semiconductor memory device includes a plurality of pins for transferring input/output data and signals. A semiconductor memory device recently proposed is required to include an EDC pin in order to increase the reliability of data transfer in a high-speed operation. The EDC includes the CRC data for detecting an error in the read and write operations. The CRC data is transferred to a data output circuit connected to the pin through a global input/output line (GIO).

The semiconductor memory device outputs the CRC data through the EDC pin in an error detection mode, and outputs the data strobe signal DQS through the EDC pin in a strobe mode. The data strobe signal DQS is a clock-like toggling signal that is output to the outside according to a column address strobe (CAS) latency (CL) together with data output in response to the read command.

Therefore, the semiconductor memory device includes a data path for outputting the CRC data of the read or write operation through the EDC pin in an error detection mode, and a data path for outputting a preset EDC hold pattern in a standby mode. Generally, in the read operation, data corresponding to a burst length (BL) are successively output through data input/output pins according to a CAS latency (CL). In addition, in the standby mode before and after outputting the data, although determined by a termination circuit, a newly proposed GDDR5 semiconductor memory deice outputs a logic high level because the termination circuit is set to a power supply voltage level.

On the other hand, the EDC pin outputs the CRC data according to a write CRC latency (CRCWL) in the write operation, and outputs the CRC data corresponding to the burst length (BL) according to a read CRC latency (CRCRL) in the read operation. Furthermore, a 4-bit EDC hold pattern preset in a mode register is output in the standby mode before and after outputting the CRC data.

The write CRC latency (CRCWL) defines a time taken until the CRC data is output after the write latency (WL) elapses from the input of the write command. The read CRC latency (CRCRL) defines a time taken until the CRC data is output after the CAS latency (CL) elapses from the input of the read command. For example, when the CAS latency (CL) is 17 and the read CRC latency (CRCRL) is 3, the CRC data is output at the moment when a time of 20×tCK (17+3=20) elapses from the input of the read command.

Furthermore, the semiconductor memory device outputs the data strobe signal DQS through the EDC pin in the strobe mode. When a strobe mode signal RDQS_MODE is activated, the data output circuit outputs a data pattern "1010" according to the CAS latency (CL) after the input of the read command, instead of outputting the CRC data. At this point, a preamble having a pattern "1010" is added to the data pattern "1010". In this way, it can be recognized that the data strobe signal DQS, which is a toggling signal like "10101010", is output through the EDC pin. Furthermore, prior to the output of the data strobe signal DQS, the logic high level is output from the termination circuit in the strobe mode, regardless of the pattern preset in the mode register.

Referring to FIG. 1, the semiconductor memory device includes a first serializer 100A, a second serializer 100B, and a third serializer 100C. The first serializer 100A serializes eight parallel CRC data into four outputs each inclusive of two successive data. The second serializer 100B receives outputs of the first serializer 100A to provide its outputs each inclusive of four successive data. The third serializer 100C receives outputs of the second serializer 100B to output eight data in series. The first serializer 100A outputs different signals according to an operation mode of the semiconductor memory device. The first serializer 100A serializes eight parallel CRC data into four successive data in an error detection mode, and outputs a pattern predetermined in a mode register to the second serializer 100B in a standby mode before and after outputting eight CRC data. Meanwhile, in a strobe mode, the first serializer 100A outputs a pattern for generating the toggling data strobe signal DQS, and outputs a logic high level signal in a standby mode before and after outputting the data strobe signal DQS.

More specifically, the first serializer 100A includes first and second phase shifters 110A and 110B, first and second multiplexers 120A and 120, and first and second latches 130A and 130B. In the error detection mode, not the strobe mode, the first and second phase shifters 110A and 110B shift phases of four data D4 to D7 of eight CRC data D0 to D7 by four times (4UI) the each data window (UI) of the eight data to be output through the pin. The first and second multiplexers 120A and 120B output four pieces of two successive data by multiplexing the four data D0 to D3 of the eight data and outputs of the first and second phase shifters 110A and 110B. The first and second latches 130A and 130B latch outputs of the first and second multiplexers 120A and 120B. When the strobe mode signal RDQS_MODE is activated, the first phase shifter 110A outputs a pattern of a logic high level and the second phase shifter 110B outputs a pattern of a logic low level.

The following description will be made about a process of serializing eight parallel CRC data D0 to D7 through the first to third serializers 100A to 100C in the error detection mode and outputting the serialized data through the EDC pin. Odd-numbered data D0, D2, D4 and D6 of the eight parallel data D0 to D7 are serialized in pairs, two by two, by the first multiplexer 120A. To this end, the first phase shifter 110A shifts the phases of the two data D4 and D6 of the odd-numbered data by the window (4UI) of the data aligned by the first multiplexers 120A. Likewise, even-numbered data D1, D3, D5 and D7 are serialized through the second phase shifter 110B and the second multiplexer 120B. The four data paired two by two by the first and second multiplexers 120A and 120B are latched by the first and second latches 130A and 130B, respectively. Each data window of the four data including two successive data output from the first and second latches 130A and 130B of the first serializer 100A is four times each data window of the serialized eight data output from the third serializer 100C.

In addition, the second serializer 100B includes third and fourth phase shifters 140A and 140B, third and fourth multiplexers 150A and 150B, and third and fourth latches 160A and 160B. The third and fourth phase shifters 140A and 140B shift phases of two data D2-D6 and D3-D7 of the four data output from the first and second latches 130A and 130B by two times (2UI) the each data window of the serialized eight data. The third and fourth multiplexers 150A and 150B output two pieces of four successive data D0-D2-D4-D6 and D1-D3-D5-D7 by multiplexing two data D0-D4 and D1-D5 of the four data and outputs of the third and fourth phase shifters 140A and 140B. The third and fourth latches 160A and 160B latch outputs of the third and fourth multiplexers 150A and 150B.

More specifically, the third and fourth phase shifters 140A and 140B delay the two data D2-D6 and D3-D7 of the four data output from the first and second latches 130A and 130B of the first serializer 100A by using a clock WCK/2 and WCKB/2 produced by dividing data clocks WCK and WCKB by ½. The data clocks WCK and WCKB serve as a reference in outputting the serialized eight data. Two data are output in one cycle of the data clocks WCK and WCKB. That is, each data window (UI) of the serialized CRC data is equal to half the cycle of the data clocks WCK and WCKB. The third and fourth phase shifters 140A and 140B use the divided clocks WCK/2 and WCKB/2 whose cycles are four times the data window (UI) of the serialized eight data, and therefore they delay the phases of the two data D2-D6 and D3-D7 by two times the data window (UI) of the serialized eight data. The third and fourth multiplexers 150A and 150B outputs two pieces of four successive data D0-D2-D4-D6 and D1-D3-D5-D7 by aligning two data D2-D6 and D3-D7, whose phases are delayed by the third and fourth phase shifters 140A and 140B, and the remaining two data D0-D4 and D1-D5. The third and fourth latches 160A and 160B latch outputs of the third and fourth multiplexers 150A and 150B and transfer the latched data to the third serializer 100C.

The third serializer 100C includes a fifth phase shifter 170 and a fifth multiplexer 180. The fifth phase shifter 170 shifts a phase of the data D1-D3-D5-D7 by the data window (UI) of the serialized eight data. The fifth multiplexer 180 outputs the serialized CRC data D0-D1-D2-D3-D4-D5-D6-D7 by multiplexing the data D0-D2-D4-D6 and an output of the fifth phase shifter 170.

Referring to FIG. 1, the semiconductor memory device further includes a serialization controller 190. The serialization controller 190 outputs a first control pulse POUT_CL15P for controlling the first and second phase shifters 110A and 110B, a second control pulse POUT_CL15 for controlling the first and second multiplexers 120A and 120B, and a data transfer signal DOFFB for controlling the first and second latches 130A and 130B in response to the read data output enable signal RDOUTEN for enabling the data output according to the read command, the strobe mode signal RDQS_MODE, and the divided clock WCK/2 produced by dividing the data clock WCK serving as the reference of the data output.

The following description will be made about the operation of the semiconductor memory device when the data strobe signal DQS is output through the EDC pin. When the strobe mode signal RDQS_MODE is activated, the first phase shifter 110A outputs logic high level signal and the second phase shifter 110B outputs a logic low level signal, regardless of the first control pulse POUT_CL15P. At this point, the serialization controller 190 maintains the second control pulse POUT_CL15 at a logic low level so that the first and second multiplexers 120A and 120B can transfer the fixed logic level signals output from the first and second phase shifters 110A and 110B. In addition, when the strobe mode signal RDQS_MODE is activated, the serialization controller 190 activates the data transfer signal DOFFB in response to the read data output enable signal RDOUTEN. Thus, the data transfer signal DOFFB enables the first and second latches 130A and 130B for 3 tCK from 1 tCK (one cycle of the system clock) earlier timing than the case of the error detection mode.

The signals output from the first and second latches 130A and 130B are phase-shifted and then serialized through the third and fourth phase shifters 140A and 140B and the third and fourth multiplexers 150A and 150B of the second serializer 100B. The signal output from the third multiplexer 150A receiving the logic high level signal and the signal output from the fourth multiplexer 150B receiving the logic low level signal are output to the outside through the fifth multiplexer 180, just like the serialized eight data D0-D1-D2-D3-D4-D5-D6-D7. At this point, the fifth multiplexer 180 alternately outputs the logic high level signal and the logic low level signal. Such a toggling signal can be used as the data strobe signal DQS.

Meanwhile, in the test mode or the training mode where the transferred data are not output, the fifth phase shifter 170 is enabled to output the arbitrary data by activating an asynchronous enable signal ASYNC_EN and an asynchronous start signal ASYNC_D0. Especially, in the initial operation where the semiconductor memory device starts to operate, the logic high level signal is output through the EDC pin. At this point, the fifth phase shifter 170 is used to output the logic high level signal.

Figure 2:
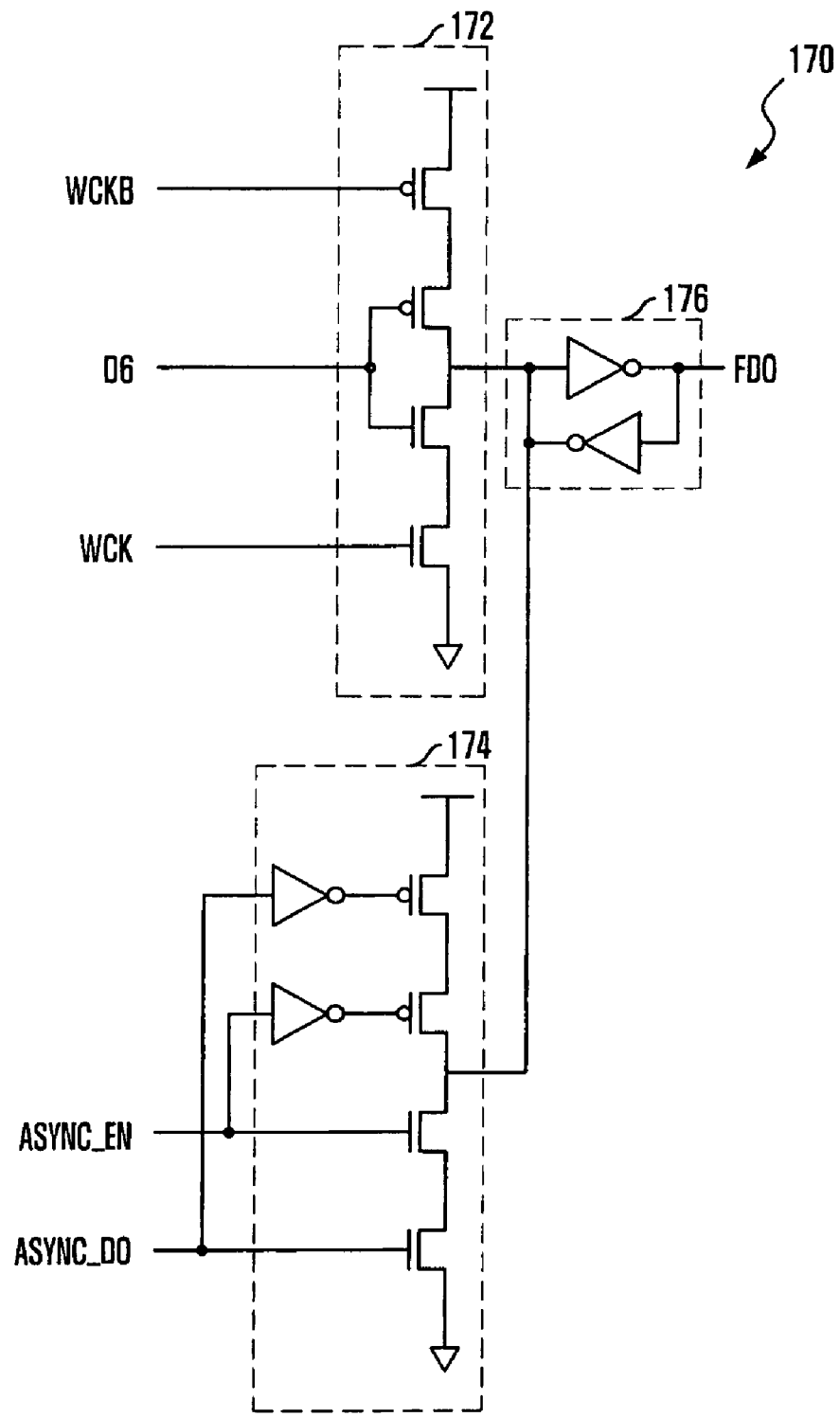
FIG. 2 is a circuit diagram of a fifth phase shifter of FIG. 1.

FIG. 2 is a circuit diagram of the fifth phase shifter 170 of FIG. 1.

Referring to FIG. 2, the fifth phase shifter 170 shifts the phase of the data D6 output from the fourth latch 160B in response to the data clock WCK, or outputs arbitrary data that are not synchronized with the system clock or the data clock WCK in a test mode or a training mode.

More specifically, the fifth phase shifter 170 includes a data inverting unit 172 for inverting data in synchronization with the data clock WCK, an asynchronous data generating unit 174 for outputting arbitrary data in the test mode or the training mode, and an inverter latch unit 176 for latching and inverting outputs of the data inverting unit 172 and the asynchronous data generating unit 174. The data inverting unit 172 inverts the input data D6 in synchronization with the rising edge of the data clock WCK, and the inverter latch unit 176 inverts the output data of the data inverting unit 172 and outputs the inverted data to the fifth multiplexer 180. The fifth multiplexer 180 receives the data output from the fifth phase shifter 170 in synchronization with the rising edge of the data clock WCK and outputs the received data to the outside in synchronization with the falling edge of the data clock WCK.

In the test mode or the training mode where the transferred data are not output, the fifth phase shifter 170 is enabled to output the arbitrary data in response to an activated asynchronous enable signal ASYNC_EN and an activated asynchronous start signal ASYNC_D0. At this point, the asynchronous enable signal ASYNC_EN is activated when the data clock CWK is disabled. During the initial operation of the semiconductor memory device, the data clock WCK is stabilized after an on-die termination (ODT) circuit is enabled. However, in the specification of the newly-proposed semiconductor memory device, the logic high level signal is required to be output through the EDC pin even in the initial operation where the data clock WCK is unstable. When the data clock buffer (not shown) transferring the external data clock WCK to the inside is disabled, the semiconductor memory device of FIG. 1 can output the asynchronous data of the logic high level through the fifth phase shifter 170.

However, after the data clock buffer is enabled, even though the data clock WCK input from the outside is still unstable, the semiconductor memory device generally does not output the asynchronous data generated from the fifth phase shifter 170, but selectively outputs the data input from the third latch 160A and the fifth phase shifter 170 to the fifth multiplexer 180. That is, even though the semiconductor memory device must output the logic high level signal in the initial operation, based on the specification of the semiconductor memory device, it is impossible to ensure that the signal output through the EDC pin is the logic high level signal because the data clock WCK is transferred to the inside. Consequently, the semiconductor memory device of FIG. 1 cannot prevent the occurrence of error before and after the data clock is input in the initial operation of the semiconductor memory device.

Figure 3:
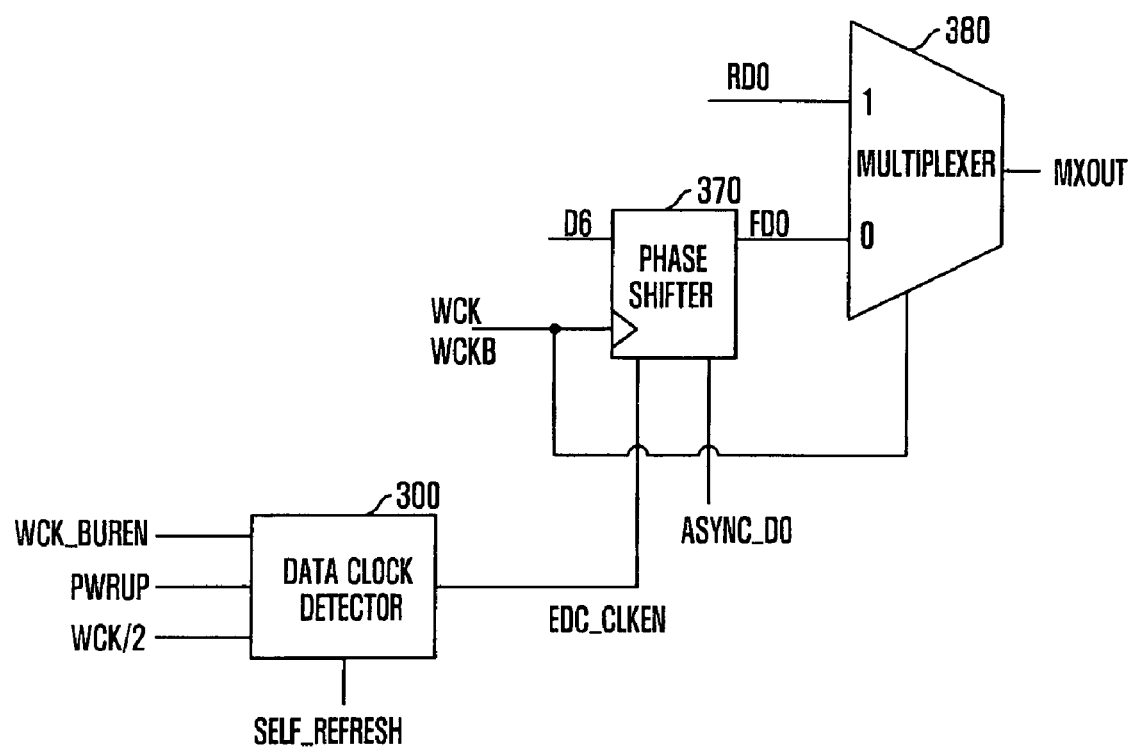
FIG. 3 is a block diagram of a semiconductor memory device in accordance with an embodiment of the present invention.

FIG. 3 is a block diagram of a semiconductor memory device in accordance with an embodiment of the present invention. Compared to the semiconductor memory device of FIG. 1, elements with the same configuration and operation are omitted.

Referring to FIG. 3, the semiconductor memory device includes a data clock detector 300, a phase shifter 370, and a multiplexer 380. The data clock detector 300 outputs a clock enable signal EDC_CLKEN notifying that the data clock WCK is stabilized after a predetermined time elapses from the input of the external data clock WCK. In response to the clock enable signal EDC_CLKEN, the phase shifter 370 latches a falling data D6 and outputs the latched falling data D6 to the multiplexer 380 when the data clock WCK is stabilized, and outputs a logic high level signal to the multiplexer 380 when the data clock WCK is not stabilized. In response to the data clock WCK, the multiplexer 380 selectively outputs a rising data RD0, which is output in synchronization with a rising edge of the data clock WCK, and a falling data FD0, which is output in synchronization with a falling edge of the data clock WCK and is transferred from the phase shifter 370.

The phase shifter 370 and the multiplexer 380 correspond to the fifth phase shifter 170 and the multiplexer 180 illustrated in FIG. 1. The phase shifter 370 and the multiplexer 380 are included in the semiconductor memory device that is responsive to the output of the data clock detector 300 to output the logic high level signal until the data clock WCK is stabilized after the power is supplied, and performs one of the error detection mode and the strobe mode when the data clock WCK is stabilized. Herein, with respect to performing one of the error detection mode and the strobe mode, that is, the case that the CRC data or the data strobe signal DQS is output through the EDC pin, detailed description will be omitted.

In the test operation or the training operation where the transferred data are not output, the fifth phase shifter 170 outputs the asynchronous data in response to the asynchronous enable signal ASYNC_EN and the asynchronous start signal ASYNC_D0. The asynchronous enable signal ASYNC_EN is activated when the data clock WCK is disabled. However, the semiconductor memory device in accordance with the embodiment of the present invention outputs the asynchronous data of the logic high level in response to the clock enable signal EDC_CLKEN output from the data clock detector 300, not the asynchronous enable signal ASYNC_EN. This aims to output the logic high level signal through the EDC pin until before the data clock WCK is stabilized in the initial operation according to the specification of the newly-proposed semiconductor memory device.

The data clock detector 300 detects the timing when the data clock WCK is stabilized in the initial operation of the semiconductor memory device. The data clock detector 300 receives a power-up signal, which indicates that the semiconductor memory device has received the external power supply voltage, and a data buffer enable signal WCK_BUFEN, which indicates that the data clock buffer (not shown) is enabled. Herein, the data clock buffer (not shown) is a circuit for buffering the external data clock WCK and transferring the buffered data clock WCK to the inside. In addition, the data clock detector 300 measures time necessary for stabilization of the data clock WCK by using a divided clock WCK/2, which is generated by dividing the data clock WCK by ½ and has the same frequency as the system clock CLK. When the semiconductor memory device performs a self-refresh operation, the data transfer is not performed with respect to the outside. Therefore, the semiconductor memory device outputs the logic high level signal through the EDC pin. To this end, when a self-refresh signal SELF_REFRESH is activated, the data clock detector 300 deactivates the clock enable signal EDC_CLKEN to enable the phase shifter 370 to output the asynchronous data of the logic high level.

Figure 4:
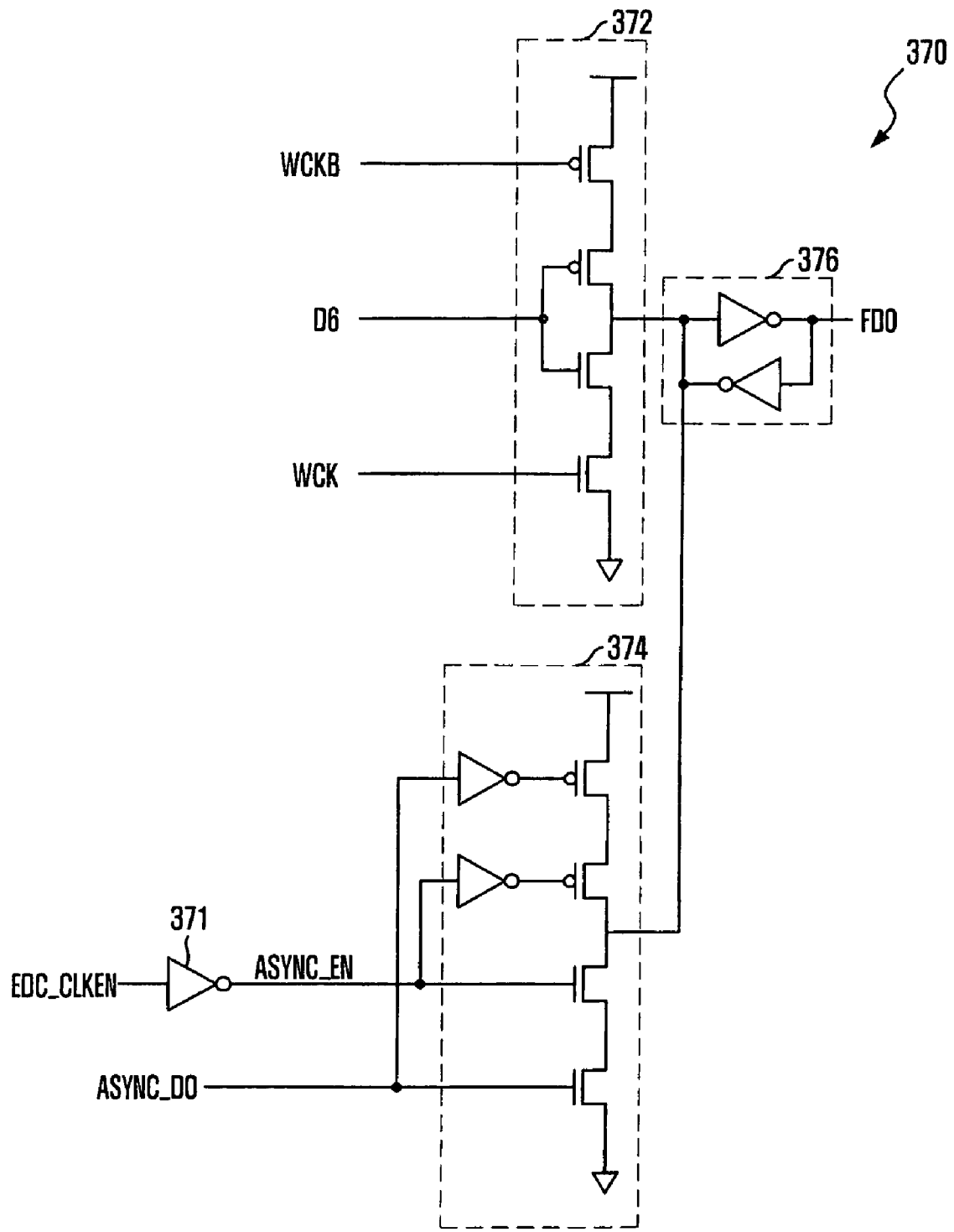
FIG. 4 is a circuit diagram of a phase shifter of FIG. 3.

FIG. 4 is a circuit diagram of the phase shifter 370 of FIG. 3.

Referring to FIG. 4, the phase shifter 370 shifts the phase of the falling data D6 output from the fourth latch 160B in response to the data clock WCK, or outputs the asynchronous data of the logic high level, which is not synchronized with the system clock CLK or the data clock WCK, when the clock enable signal EDC_CLKEN output from the data clock detector 300 is deactivated, as well as in the test operation or the training operation.

More specifically, the phase shifter 370 includes an inverter 371, a data inverting unit 372, an asynchronous data generating unit 374, and an inverter latch unit 376. The inverter 371 inverts the clock enable signal EDC_CLKEN output from the data clock detector 300. The data inverting unit 372 inverts data in synchronization with the data clock WCK. The asynchronous data generating unit 374 outputs the asynchronous data when the clock enable signal EDC_CLKEN output from the data clock detector 300 is deactivated, as well as in the test operation and the training operation. The inverter latch unit 376 latches the outputs of the data inverting unit 372 and the asynchronous data generating unit 374 and outputs an inversion signal. The phase shifter 370 in accordance with the embodiment of the present invention differs from the fifth phase shifter 170 of FIG. 2 in that it further includes the inverter 371 for inverting the clock enable signal EDC_CLKEN output from the data clock detector 300, instead of the asynchronous enable signal ASYNC_EN.

Figure 5:
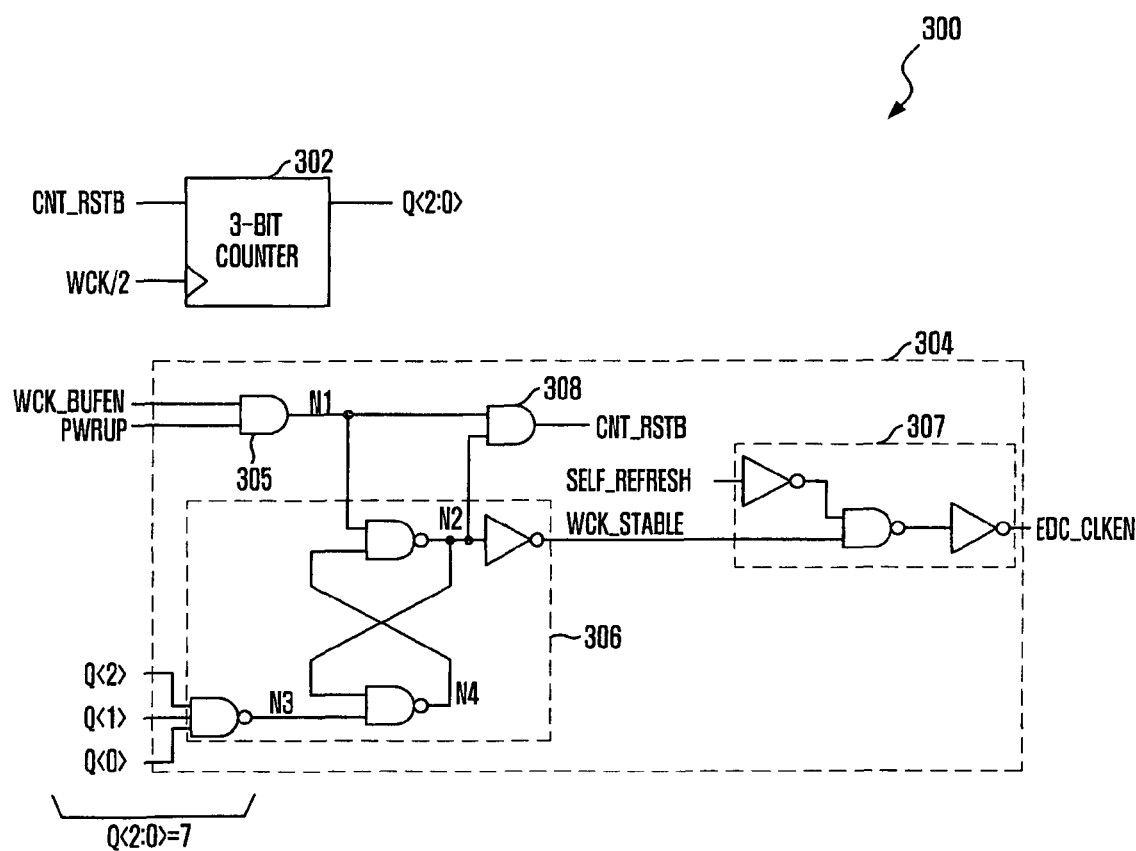
FIG. 5 is a circuit diagram of a data clock detector of FIG. 3.

FIG. 5 is a circuit diagram of the data clock detector 300 of FIG. 3.

Referring to FIG. 5, the data clock detector 300 includes a counter 302 and a determiner 304. The counter 302 counts rising edges of the data clock WCK, and the determiner 304 outputs the clock enable signal EDC_CLKEN according to the operation environment and the output of the counter 302. The data clock detector 300 deactivates the clock enable signal EDC_CLKEN when the semiconductor memory device performs the self-refresh operation. Also, after the power is supplied to the semiconductor memory device, the data clock detector 300 recognizes that the data clock WCK is stabilized when a predetermined time corresponding to the output of the counter 302 elapses since the data clock buffer has been enabled.

More specifically, the counter 302 is a 3-bit counter that counts rising edges of the divided clock WCK/2, which is produced by dividing the data clock WCK by ½. That is, the counter 302 counts from 0 ("000") up to 7 ("111") to generate a 3-bit signal Q<2:0>. The counter 302 is reset by a reset signal CNT_RSTB. The reset signal CNT_RSTB is an active high signal. That is, the reset signal CNT_RSTB is activated to a logic low level and deactivated to a logic high level.

The determiner 304 includes a first logic unit 305, a second logic unit 306, a third logic unit 308, and a fourth logic unit 307. The first logic unit 305 indicates that the power is supplied and the data clock buffer is enabled. The second logic unit 306 indicates that a predetermined time elapses with respect to the output of the first logic unit 305 and the maximum value output from the counter 302. The third logic unit 308 resets the counter 302 in response to the output of the second logic unit 306. The fourth logic unit 307 outputs the clock enable signal EDC_CLKEN by inverting the output WCK_STABLE of the second logic unit 302 when the self-refresh operation is performed, and outputs the clock enable signal EDC_CLKEN by buffering the output WCK_STABLE of the second logic unit 306 when the self-refresh operation is not performed.

The first logic unit 305 includes an AND gate that performs an AND operation on the data clock buffer signal WCK_BUFEN and the power-up signal PWRUP. The data clock buffer signal WCK_BUFEN indicates if the data clock buffer (not shown) for buffering the external data clock WCK is enabled. The power-up signal PWRUP indicates if the power is supplied to the semiconductor memory device. When the output of the first logic unit 305 is a logic high level (that is, the power is supplied and the data clock buffer is enabled), the third logic unit 308 deactivates the reset signal CNT_RSTB to a logic high level. The counter 302 counts the rising edges of the divided clock WCK/2. When the output Q<2:0> of the counter 302 reaches the maximum value "111"=7, the second logic unit 306 recognizes that the data clock WCK is stabilized, and outputs the stabilization signal WCK_STABLE. In addition, when the output Q<2:0> of the counter 302 reaches the maximum value "111"=7, the third logic unit 308 receives the output N2 of the latch implemented with a NAND gate in the second logic unit 306 and activates the reset signal CNT_RSTB, thereby stopping the operation of the counter 302.

The fourth logic unit 307 receives the stabilization signal WCK_STABLE from the second logic unit 306 and outputs the clock enable signal EDC_CLKEN in response to the self-refresh signal SELF_REFRESH indicating that the self-refresh operation is performed. When the self-refresh operation is performed, the clock enable signal EDC_CLKEN is deactivated. When the self-refresh operation is not performed, the stabilization signal WCK_STABLE is buffered and then output as the clock enable signal EDC_CLKEN.

Figure 6:
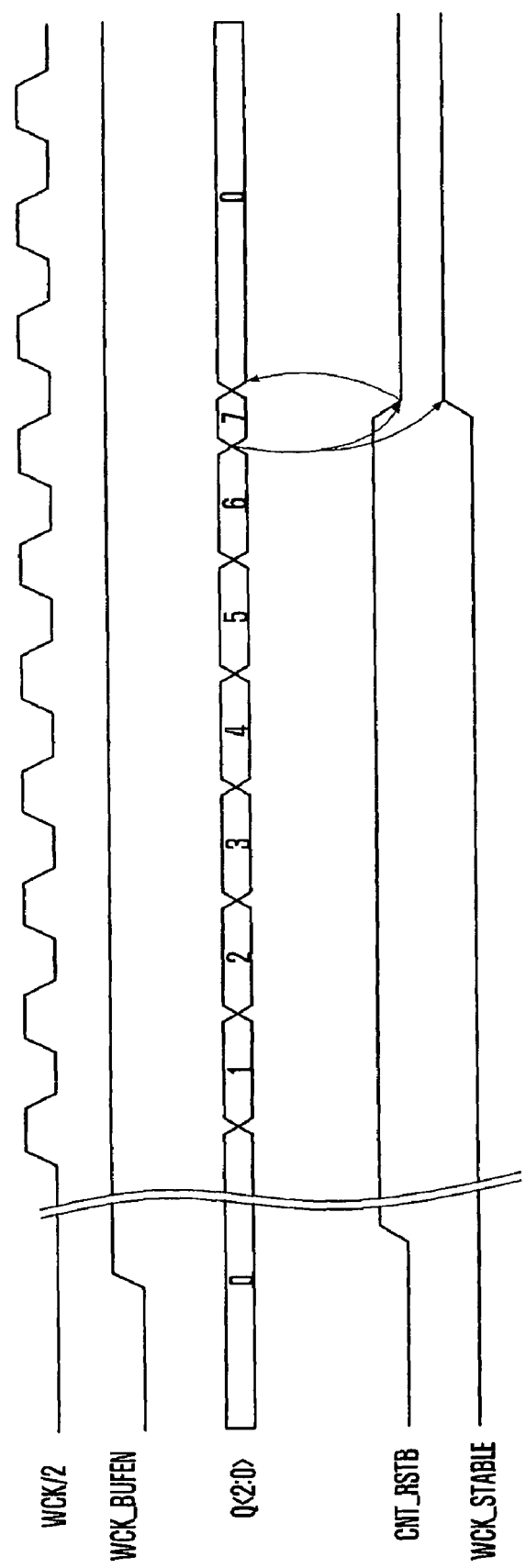
FIG. 6 is a timing diagram illustrating the operation of a data clock detector of FIG. 5.

FIG. 6 is a timing diagram illustrating the operation of the data clock detector 300 of FIG. 5.

Referring to FIG. 6, when the data clock buffer is enabled after the external power is supplied to the semiconductor memory device, the data clock buffer signal WCK_BUFEN is activated to a logic high level. The third logic unit 308 deactivates the reset signal CNT_RSTB to a logic high level, and the divided clock WCK/2 produced by dividing the data clock WCK by ½ is input to the counter 302. The counter 302 counts the rising edges of the divided clock WCK/2. When the count value Q<2:0> of the counter 302 reaches the maximum value "111"=7, the second logic unit 306 activates the stabilization signal WCK_STABLE to a logic high level, and the third logic unit 308 activates the reset signal CNT_RSTB to a logic low level.

Figure 7:
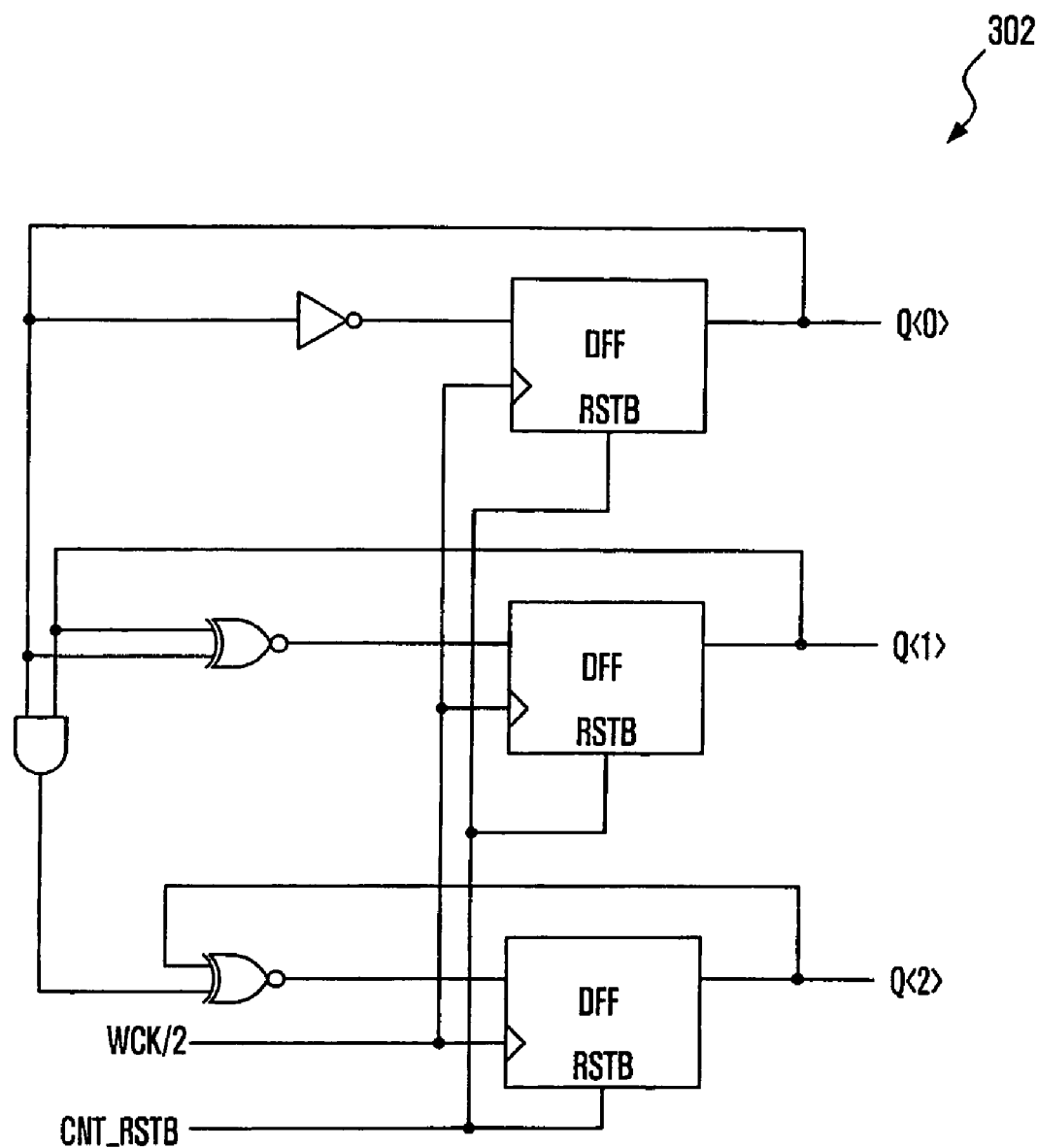
FIG. 7 is a circuit diagram of a counter of FIG. 5.

FIG. 7 is a circuit diagram of the counter 302 of FIG. 5.

Referring to FIG. 7, the counter 302 is implemented with a 3-bit counter counting the rising edges of the divided clock WCK/2. The counter 302 increases the 3-bit signal Q<2:0> by 1 at each rising edge of the divided clock WCK/2. Specifically, the counter 302 includes a plurality of logic gates and a plurality of flip-flops. Since the operations of the logic gates and the flip-flops are well known to those skilled in the art, detailed description thereof will be omitted.

In the semiconductor memory device in accordance with the embodiment of the present invention, the divided clock WCK/2 is input to the data clock detector 300, and a predetermined time is measured using the counter 302 outputting the 3-bit signal. However, the data clock WCK instead of the divided clock WCK/2 can also be used, and the division clock having a different division ratio can also be used. Further, instead of the 3-bit counter, a 2-bit counter or a 4-bit counter can also be used.

A method for operating the semiconductor memory device in accordance with an embodiment of the present invention includes: determining an output of the asynchronous data by checking whether the data clock WCK is in a stable state; outputting the asynchronous data of, for example, a logic high level specified in the specification, when the data clock WCK is disabled; and outputting the synchronous data in response to the data clock WCK when the data clock WCK is enabled.

Specifically, the determining the output of the asynchronous data includes: counting the rising edges of the data clock WCK; and deactivating the clock enable signal EDC_CLKEN when the self-refresh operation is performed, and activating the clock enable signal EDC_CLKEN in response to the count value after the power is supplied and the data clock buffer is enabled. In addition, the outputting of the asynchronous data includes outputting the logic high level signal when the clock enable signal EDC_CLKEN is deactivated.

The outputting of the synchronous data includes: performing the error detection mode; and performing the strobe mode. Specifically, when the semiconductor memory device performs the read and write operations in the error detection mode, the CRC data are output. In the standby mode, the data patterns set in the mode register are output. In addition, during the strobe mode, the semiconductor memory device outputs the data strobe signal DQS that will be output together with the data output in the read operation. In the standby mode, the logic high level signal is output.

As describe above, the semiconductor memory device outputs the CRC data through the EDC pin so that the external data processor can determine if error exists in the data processed in the write and read operations. The semiconductor memory device can also output the asynchronous data of the logic high level in the initial operation, based on the newly proposed specification. In this way, the error of the interface with the system using the semiconductor memory device can be reduced and the compatibility with electronic circuits can be improved.

In accordance with the embodiments of the present invention, the semiconductor memory device can output the logic high level through the EDC pin in the initial operation, based on the specification. Furthermore, the semiconductor memory device can operate based on the JEDEC specification, the international standardization organization, thereby improving the compatibility with electronic circuits within the system.

While the present invention has been described with respect to the specific embodiments, it will be apparent to those skilled in the art that various changes and modifications may be made without departing from the spirit and scope of the invention as defined in the following claims.

What is claimed is:

1. A semiconductor memory device, comprising:
an output circuit configured to output a synchronous data in response to a data clock when the data clock is enabled, and output an asynchronous data when the data clock is disabled; and
a data clock detection circuit configured to control outputting the asynchronous data by checking whether the data clock is in a stable state, wherein the data clock is stabilized after an on-die termination circuit is enabled.

2. The semiconductor memory device as recited in claim 1, wherein the output circuit includes:
a multiplexer configured to selectively output rising data, which are output in synchronization with rising edges of the data clock, and falling data, which are output in synchronization with falling edges of the data clock, in response to the data clock as a serialized data; and
a phase shifter configured to output the falling data by latching data or output a logic high level signal, to the multiplexer in response to a clock enable signal of the data clock detection circuit.

3. The semiconductor memory device as recited in claim 2, wherein the phase shifter includes:
an inverter configured to invert the clock enable signal;
a data inverting unit configured to invert the data in synchronization with the data clock;
an asynchronous data generating unit configured to generate the asynchronous data in response to an output of the data inverting unit; and
an inverter latch unit configured to latch outputs of the data inverting unit and the asynchronous data generating unit to output a latched signal.

4. The semiconductor memory device as recited in claim 2, wherein the rising data and the falling data are cyclic redundancy check (CRC) data for detecting if error exists in data used in a write operation and a read operation.

5. The semiconductor memory device as recited in claim 4, wherein the output circuit further includes:
a first serializer configured to serialize eight parallel CRC data into four outputs each inclusive of two successive data, or output a first pattern for a strobe signal and a second pattern to be output in a standby mode according to operation modes; and
a second serializer configured to receive an output of the first serializer to output the rising data and the falling data.

6. The semiconductor memory device as recited in claim 1, wherein the data clock detection circuit includes:
a counter configured to count rising edges of the data clock; and
a determiner configured to output a clock enable signal in response to operation environment and an output of the counter.

7. The semiconductor memory device as recited in claim 6, wherein the data clock detection circuit deactivates the clock enable signal when a self-refresh operation is performed in the semiconductor memory device.

8. The semiconductor memory device as recited in claim 7, wherein the determiner includes:
a first logic unit configured to indicate that power is supplied and a data clock buffer is enabled;
a second logic unit configured to indicate that a predetermined time elapses with respect to an output of the first logic unit and an output of the counter;
a third logic unit configured to reset the counter in response to an output of the second logic unit; and
a fourth logic unit configured to output the clock enable signal by inverting the output of the second logic unit when the self-refresh operation is performed, and output the clock enable signal by buffering the output of the second logic unit when the self-refresh operation is not performed.

9. The semiconductor memory device as recited in claim 6, wherein the data clock detection circuit recognizes that the data clock is stabilized when a predetermined time corresponding to an output of the counter elapses after power is supplied to the semiconductor memory device and a data clock buffer is enabled.

10. A semiconductor memory device, comprising:
a clock detection circuit configured to notify that a data clock is stabilized when a predetermined time elapses after the input of an external data clock, wherein the data clock is stabilized after an on-die termination circuit is enabled; and
an output circuit configured to output a logic high level signal through an EDC pin until the data clock is stabilized after power is supplied, and perform one of an error detection mode and a strobe mode when the data clock is stabilized, in response to an output of the clock detection circuit.

11. The semiconductor memory device as recited in claim 10, wherein the output circuit outputs cyclic redundancy check (CRC) data when the semiconductor memory device performs a read operation and a write operation, and outputs data pattern set in a mode register in a standby mode, in the error detection mode.

12. The semiconductor memory device as recited in claim 10, wherein the output circuit outputs a data strobe signal, which is to be output together with data output in a read operation, or outputs a logic high level signal in a standby mode, during the strobe mode.

13. The semiconductor memory device as recited in claim 10, wherein the clock detection circuit includes:
   a counter configured to count rising edges of the data clock; and
   a determiner configured to deactivate a clock enable signal when a self-refresh operation is performed, and activate the clock enable signal in response to an output of the counter when power is supplied and a data clock buffer is enabled.

14. The semiconductor memory device as recited in claim 13, wherein the counter is a 3-bit counter and the clock enable signal is activated fourteen periods after the external data clock is applied.

15. A method for operating a semiconductor memory device, the method comprising:
   controlling outputting an asynchronous data by checking whether a data clock is in a stable state, wherein the data clock is stabilized after an on-die termination circuit is enabled and;
   outputting the asynchronous data when the data clock is disabled; and
   outputting a synchronous data in response to the data clock when the data clock is enabled.

16. The method as recited in claim 15, wherein the controlling the outputting the asynchronous data includes:
   counting rising edges of the data clock; and
   deactivating a clock enable signal when a self-refresh operation is performed, and activating the clock enable signal in response to a count value after power is supplied and a data clock buffer is enabled.

17. The method as recited in claim 16, wherein outputting the asynchronous data includes outputting a logic high level signal when the clock enable signal is deactivated.

18. The method as recited in claim 15, wherein outputting the synchronous data includes:
   performing an error detection mode; and
   performing a strobe mode.

19. The method as recited in claim 18, wherein performing the error detection mode includes:
   outputting cyclic redundancy check (CRC) data when the semiconductor memory device performs a read operation and a write operation; and
   outputting data patterns set in a mode register in a standby mode.

20. The method as recited in claim 18, wherein performing the strobe mode includes:
   outputting a data strobe signal, which is to be output together with data output in a read operation; and
   outputting a logic high level signal in a standby mode.

* * * * *